United States Patent
Maesono (10) Patent No.: US 10,554,855 B2
(45) Date of Patent: Feb. 4, 2020

(54) LOGIN AND LOGOUT SYSTEM, ELECTRONIC DEVICE AND RECORDING MEDIUM

(71) Applicant: Kyocera Document Solutions Inc., Osaka (JP)

(72) Inventor: Yuya Maesono, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 16/049,970

(22) Filed: Jul. 31, 2018

(65) Prior Publication Data

US 2019/0037104 A1    Jan. 31, 2019

(30) Foreign Application Priority Data

Jul. 31, 2017    (JP) .................................. 2017-147388

(51) Int. Cl.
*H04N 1/44* (2006.01)
*H04N 1/00* (2006.01)
*G06K 9/00* (2006.01)

(52) U.S. Cl.
CPC ......... *H04N 1/442* (2013.01); *G06K 9/00288* (2013.01); *G06K 9/00926* (2013.01); *H04N 1/00336* (2013.01)

(58) Field of Classification Search
None
See application file for complete search history.

(56) References Cited

U.S. PATENT DOCUMENTS

| 2016/0094756 A1* | 3/2016 | Onishi | H04N 1/442 358/1.13 |
| 2017/0094121 A1* | 3/2017 | Mizuno | G06F 21/45 |
| 2017/0171431 A1* | 6/2017 | Towata | G06K 9/00268 |

FOREIGN PATENT DOCUMENTS

JP    2017-073062 A    4/2017

* cited by examiner

*Primary Examiner* — Andrew H Lam
(74) *Attorney, Agent, or Firm* — James Judge (57) ABSTRACT

A login and logout system includes an electronic device, a camera, a storage device, a login control unit, a face-image managing unit, and a logout control unit. The login control unit controls a login of a user of the electronic device. The face-image managing unit manages a face image of the user. The logout control unit controls a logout of the user. The face-image managing unit writes the face image that is captured by the camera at a specific timing pertaining to the login permitted by the login control unit to the storage device. After the login of the user is permitted by the login control unit, the logout control unit causes the user to log out when the user becomes unauthenticated by a face authentication based on the face image captured by the camera and the face image stored in the storage device.

5 Claims, 5 Drawing Sheets

LOGIN AND LOGOUT SYSTEM, ELECTRONIC DEVICE AND RECORDING MEDIUM

INCORPORATION BY REFERENCE

This application is based upon, and claims the benefit of priority from, corresponding Japanese Patent Application No. 2017-147388 filed in the Japan Patent Office on Jul. 31, 2017, the entire contents of which are incorporated herein by reference.

BACKGROUND

Unless otherwise indicated herein, the description in this section is not prior art to the claims in this application and is not admitted to be prior art by inclusion in this section.

There is known a technique that permits a login of a user when the user is authenticated by a face authentication based on a face image captured by a camera and a face image that has been preliminarily registered. After this technique has permitted the login of the user, the technique causes the user to log out when the user becomes unauthenticated by the face authentication based on the face image captured by the camera and the face image that has been preliminarily registered.

SUMMARY

A login and logout system according to one aspect of the disclosure includes an electronic device, a camera, a storage device, a login control unit, a face-image managing unit, and a logout control unit. The login control unit controls a login of a user of the electronic device. The face-image managing unit manages a face image of the user. The logout control unit controls a logout of the user. The face-image managing unit writes the face image that is captured by the camera at a specific timing pertaining to the login permitted by the login control unit to the storage device. After the login of the user is permitted by the login control unit, the logout control unit causes the user to log out when the user becomes unauthenticated by a face authentication based on the face image captured by the camera and the face image stored in the storage device.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 4 illustrates operations of the image forming apparatus according to the one embodiment when a user logs in.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure by referring to the attached drawings.

First, a description will be given of a configuration of a login and logout system according to an embodiment.

Figure 1:
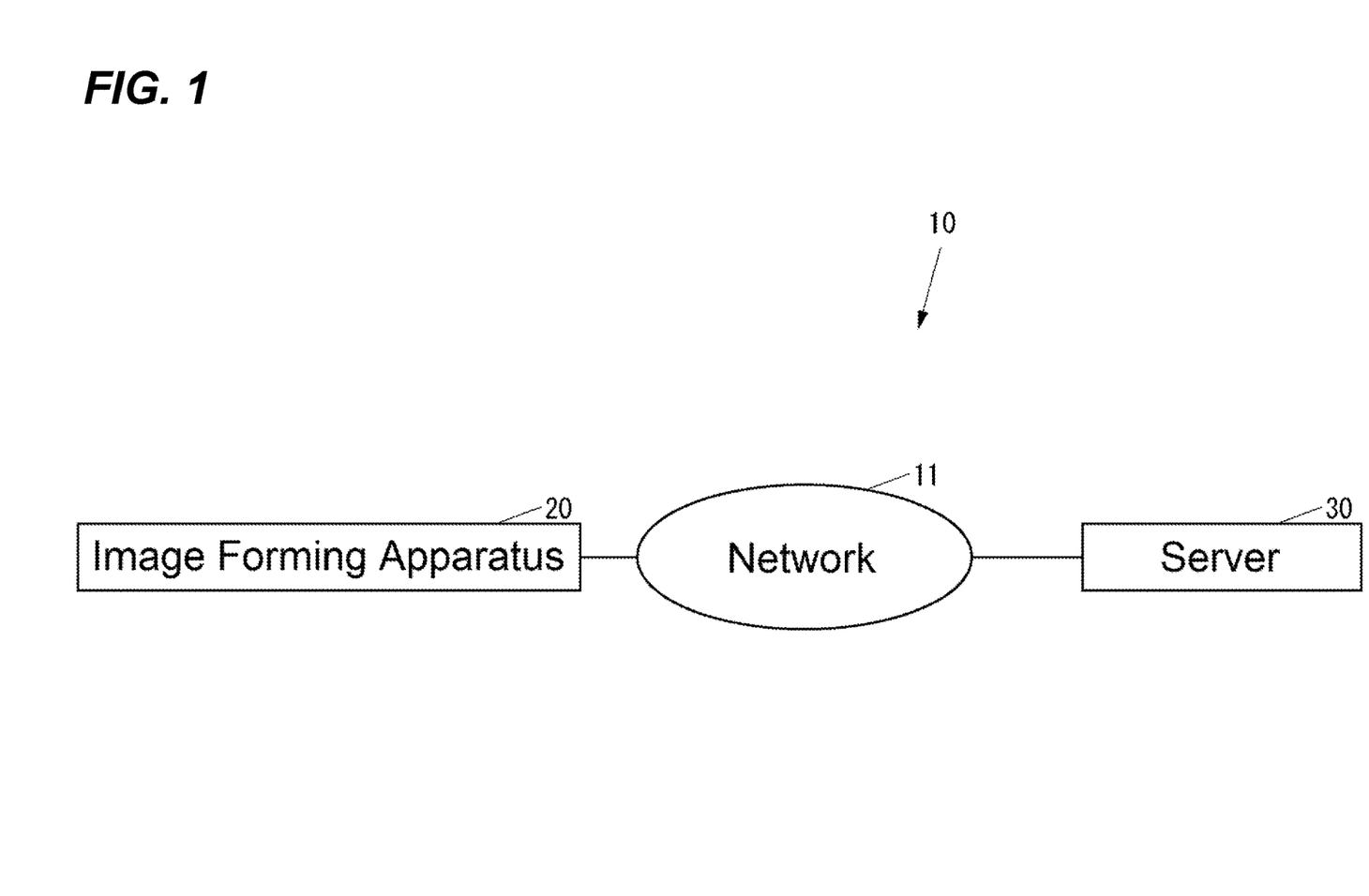
FIG. 1 illustrates a block diagram illustrating a login and logout system according to one embodiment of the disclosure.

FIG. 1 illustrates a block diagram illustrating a login and logout system 10 according to the embodiment.

As illustrated in FIG. 1, the login and logout system 10 includes an image forming apparatus 20 as an electronic device and a server 30 as electronic devices. The image forming apparatus 20 and the server 30 can be connected via a network 11, such as a local area network (LAN) or the Internet.

The login and logout system 10 ensures including one or more image forming apparatuses other than the image forming apparatus 20. The image forming apparatus included in the login and logout system 10 is an image forming apparatus, such as a multifunction peripheral (MFP), a printer-only machine, a copy-only machine, a FAX-only machine, or a scanner-only machine.

Figure 2:
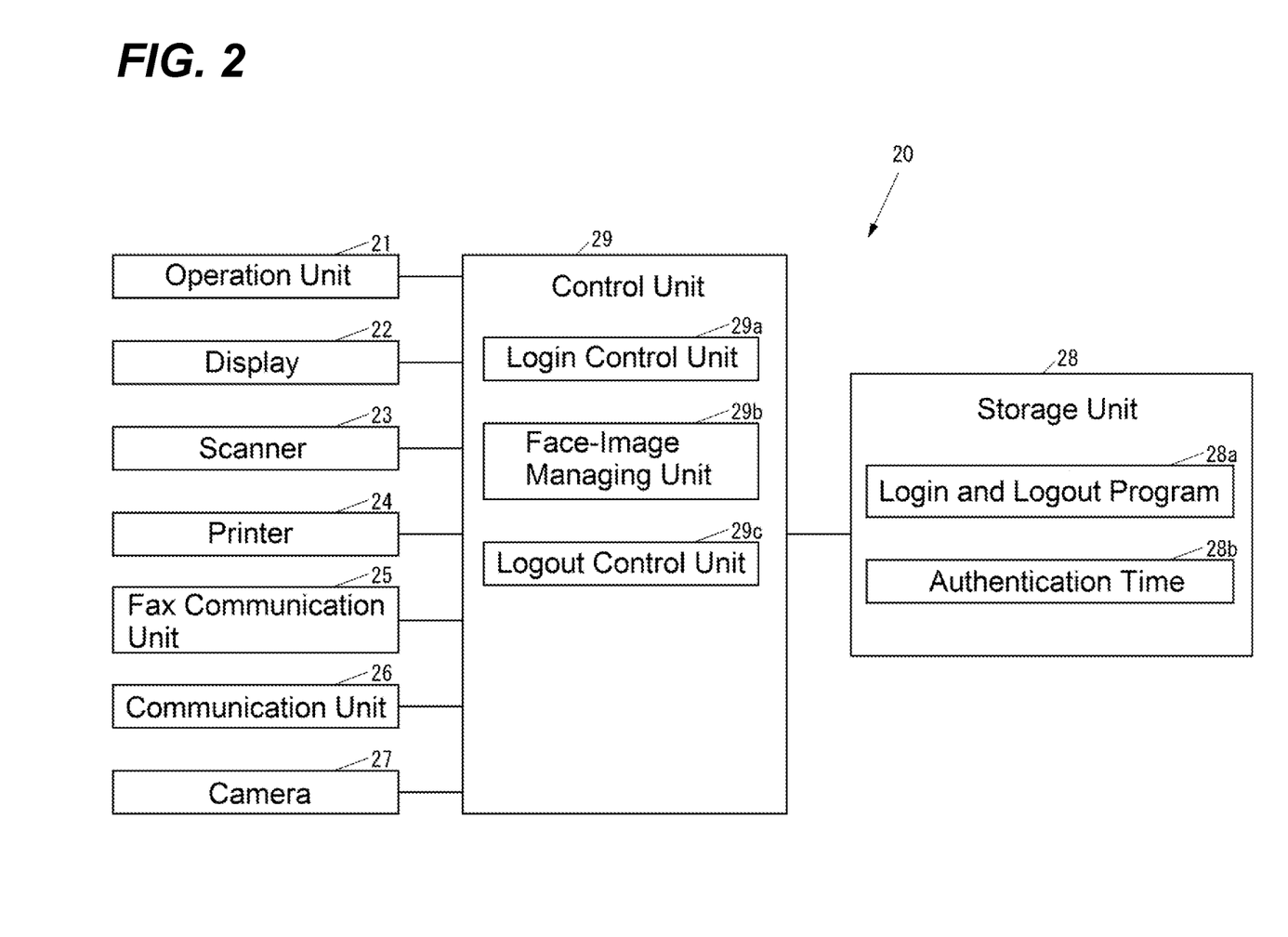
FIG. 2 illustrates a block diagram illustrating an image forming apparatus according to one embodiment in a case of an MFP.

FIG. 2 illustrates a block diagram illustrating the image forming apparatus 20 in a case of an MFP.

The image forming apparatus 20 illustrated in FIG. 2 is a computer that includes an operation unit 21, a display 22, a scanner 23, a printer 24, a fax communication unit 25, a communication unit 26, a camera 27, a storage unit 28, and a control unit 29. The operation unit 21 is an input device, such as buttons by which various kinds of operations are entered. The display 22 is a display device, such as a liquid crystal display (LCD) that displays various kinds of information. The scanner 23 is a reading device that reads an image from a document. The printer 24 is a print device that prints an image to a recording medium, such as a paper sheet. The fax communication unit 25 is a fax device that performs fax communications with an external facsimile device (not illustrated) via a communication line, such as a dial-up line. The communication unit 26 is a communication device that communicates with an external device via the network 11 (see FIG. 1) or directly by wired or wireless communications without via the network 11. The camera 27 is located at a position where the camera 27 can capture a face image of a person situated in front of the image forming apparatus 20. The storage unit 28 is a non-volatile storage device, such as a semiconductor memory or a hard disk drive (HDD) that stores various kinds of information. The control unit 29 controls the whole image forming apparatus 20.

The storage unit 28 stores a login and logout program 28a for controlling a login and a logout of a user. The login and logout program 28a may be installed onto the image forming apparatus 20 at production stage of the image forming apparatus 20, may be additionally installed onto the image forming apparatus 20 from an external storage medium, such as a universal serial bus (USB) memory, and may be additionally installed onto the image forming apparatus 20 from the network 11.

The storage unit 28 is configured to store an authentication time 28b that indicates a time at which authentication of a user is executed.

The control unit 29 includes, for example, a central processing unit (CPU), a read-only memory (ROM) that stores programs and various kinds of data, and a random-access memory (RAM) that is used as a work area of the CPU. The CPU executes the programs stored in the ROM or the storage unit 28.

The control unit 29 executes the login and logout program 28a to achieve a login control unit 29a that controls the login of a user of the image forming apparatus 20, a face-image managing unit 29b that manages the face image of the user of the image forming apparatus 20, and a logout control unit 29c that controls the logout of the user of the image forming apparatus 20.

Figure 3:
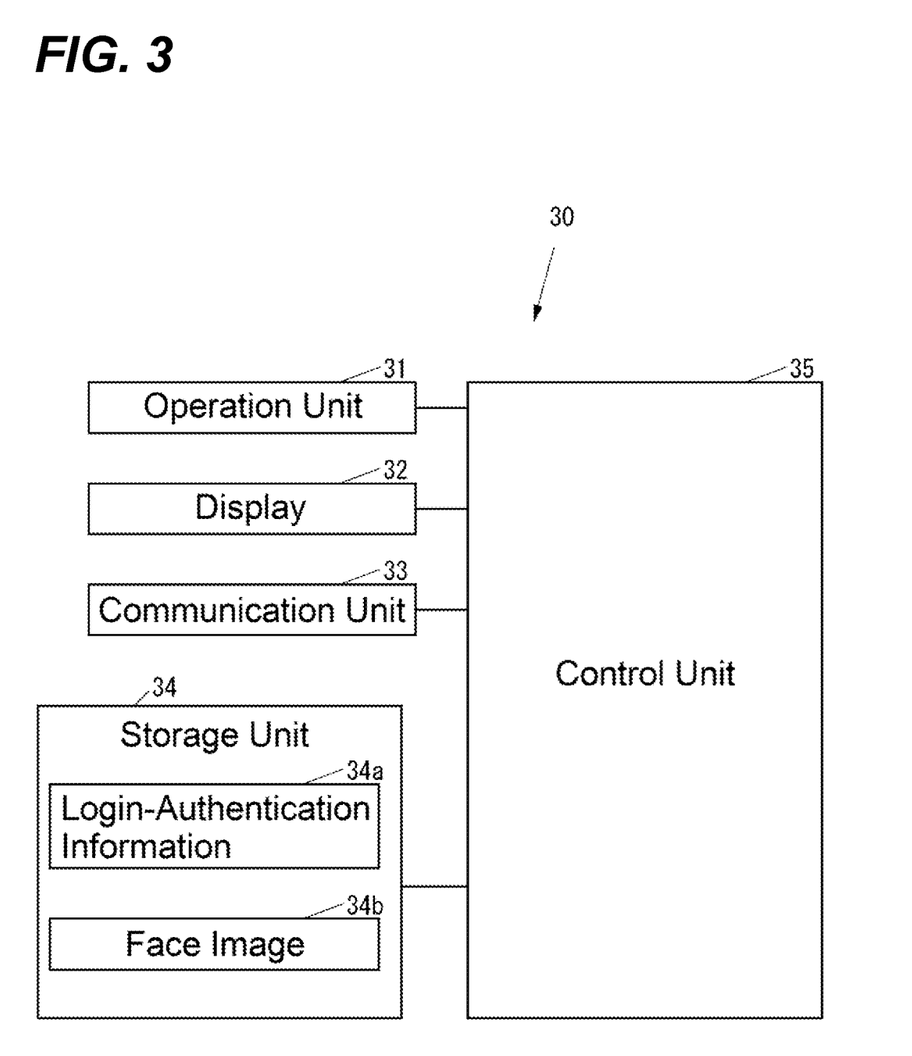
FIG. 3 illustrates a block diagram illustrating a server according to the one embodiment.

FIG. 3 illustrates a block diagram illustrating the server 30.

As illustrated in FIG. 3, the server 30 includes: an operation unit 31 that is an input device, such as a keyboard and a computer mouse by which various kinds of operations are entered; a display 32 that is a display device, such as an LCD that displays various kinds of information; a communication unit 33 that is a communication device that communicates with an external device via the network 11 (see FIG. 1) or directly by wired or wireless communications without via the network 11; a storage unit 34 that is a non-volatile storage device, such as a semiconductor memory and an HDD that stores various kinds of information; and a control unit 35 that controls the whole server 30.

The storage unit 34 stores login-authentication information 34a for authentication at the login of the user of the image forming apparatus 20 included in the login and logout system 10 (see FIG. 1). The login-authentication information 34a is information for an authentication method other than a face authentication based on the face image captured by the camera 27. For example, the login-authentication information 34a may be identification information of an integrated circuit (IC) card or may be a combination of an ID and a password.

The storage unit 34 is configured to store a face image 34b of the user of the image forming apparatus 20 included in the login and logout system 10.

The control unit 35 includes, for example, a CPU, a ROM that stores the programs and various kinds of data, and a RAM that is used as a work area of the CPU. The CPU executes the programs stored in the ROM or the storage unit 34.

Next, a description will be given of operations of the login and logout system 10.

First, a description will be given of operations of the image forming apparatus 20 when a user logs in.

Figure 4:
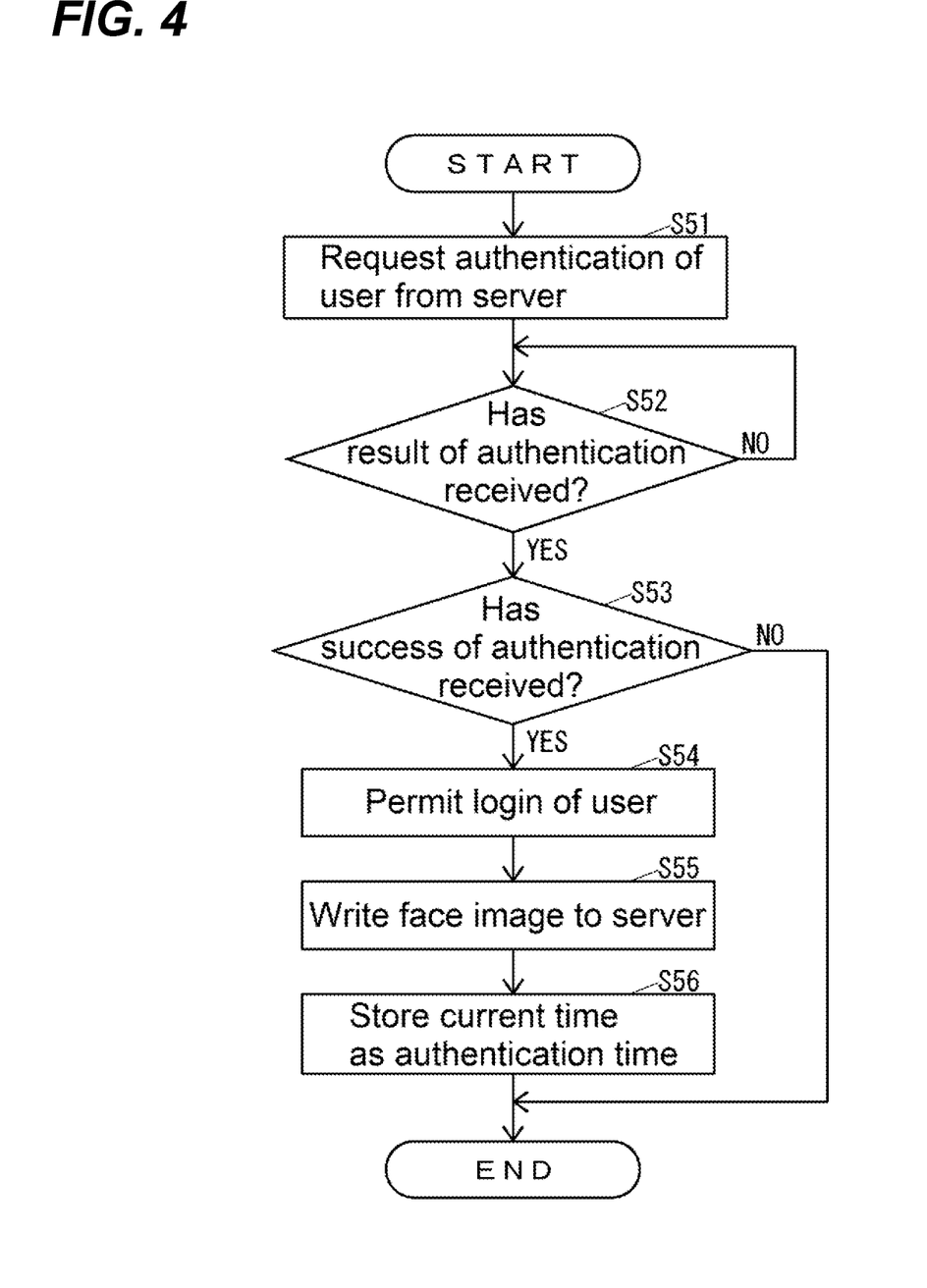

FIG. 4 illustrates the operations of the image forming apparatus 20 when a user logs in.

When a user instructs the login by entering the login-authentication information for authentication at the login, the control unit 29 of the image forming apparatus 20 executes the operations illustrated in FIG. 4.

As illustrated in FIG. 4, the login control unit 29a requests the authentication of the user from the server 30 by transmitting the login-authentication information entered by the user to the server 30 (Step S51) and determines whether a result of the authentication by the server 30 has been received or not until determining the reception of the result of the authentication by the server 30 (Step S52).

Here, when the authentication of the user is requested from the image forming apparatus 20, the control unit 35 of the server 30 determines whether the login-authentication information 34a identical to the login-authentication information transmitted from the image forming apparatus 20 is stored or not. Then, when the login-authentication information 34a identical to the login-authentication information transmitted from the image forming apparatus 20 is stored, the control unit 35 transmits a success of the authentication as a result of the authentication to the image forming apparatus 20. On the other hand, when the login-authentication information 34a identical to the login-authentication information transmitted from the image forming apparatus 20 is not stored, the control unit 35 transmits a failure of the authentication as a result of the authentication to the image forming apparatus 20.

When the login control unit 29a determines the reception of the result of the authentication by the server 30 at Step S52, the login control unit 29a determines whether the success of the authentication as a result of the authentication has been received or not (Step S53).

When the login control unit 29a determines no reception of the success of the authentication as a result of the authentication, that is, the reception of the failure of the authentication at Step S53, the login control unit 29a terminates the operations illustrated in FIG. 4.

When it is determined that the reception of the success of the authentication as a result of the authentication at Step S53, the login control unit 29a permits the login of the user (Step S54).

Subsequently, the face-image managing unit 29b writes the face image captured by the camera 27 at a specific timing pertaining to the login permitted at Step S54 to the server 30 (Step S55). The control unit 35 of the server 30 stores the face image writing of which is instructed from the image forming apparatus 20 as the face image 34b associated with the identification information of the user permitted to log in at Step S54.

Here, the specific timing pertaining to the login can be considered to be a timing at the login, or various timings before and after the login. For example, the specific timing pertaining to the login may be the timing at which the login of the user is permitted at Step S54. Alternatively, when there is a login button for starting login processing, the specific timing pertaining to the login may be the timing at which the login button is pressed. Further, when the login-authentication information is the identification information of the IC card, the specific timing pertaining to the login may be the timing at which the IC card is read for the login by an IC card reader of the operation unit 21. Furthermore, when the login-authentication information is the combination of the ID and the password, the specific timing pertaining to the login may be the time at which at least one of the ID and the password is entered from the operation unit 21.

The face image written to the server 30 at Step S55 may be one, or may be a plurality of face images captured by the camera 27 at mutually different timings. Typically, in the face authentication, a configuration that compares a target face image with a plurality of face images has higher accuracy in authentication than a configuration that compares a target face image with one face image.

After the process at Step S55, the logout control unit 29c stores a current time as the authentication time 28b (Step S56) to terminate the operations illustrated in FIG. 4.

Next, a description will be given of the operations of the image forming apparatus 20 when causing a user to automatically log out.

Figure 5:
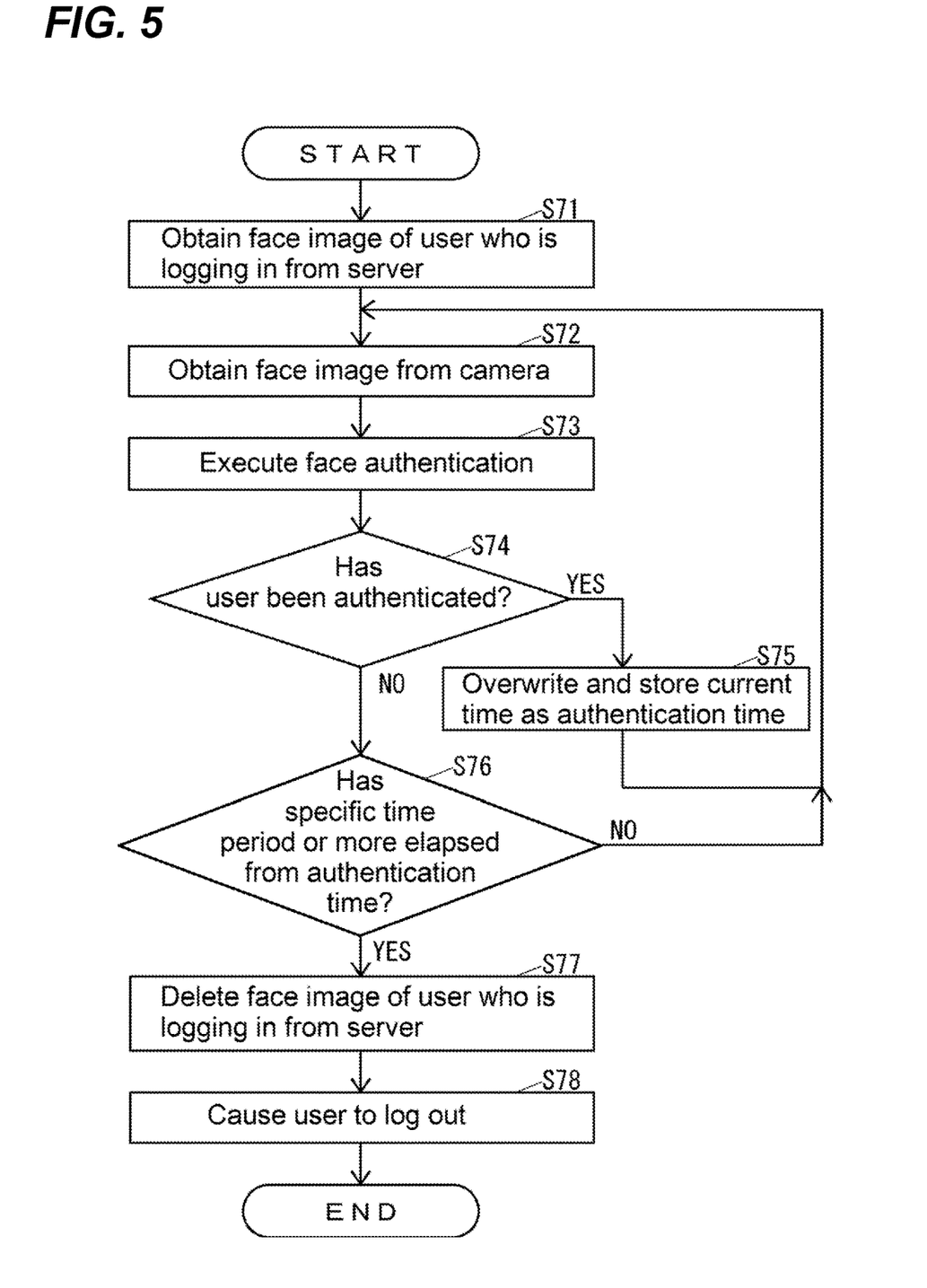
FIG. 5 illustrates operations of the image forming apparatus according to the one embodiment when causing a user to automatically log out.

FIG. 5 illustrates the operations of the image forming apparatus 20 when causing a user to automatically log out.

After a user has logged in, the control unit 29 of the image forming apparatus 20 executes the operations illustrated in FIG. 5 until the user logs out.

As illustrated in FIG. 5, the logout control unit 29c obtains the face image of the user who is logging in from the server 30 by transmitting the identification information of the user who is logging in to the server 30 (Step S71). The control unit 35 of the server 30 transmits the face image 34b, which has been stored associated with the identification information transmitted from the image forming apparatus 20, to the image forming apparatus 20.

After the process at Step S71, the logout control unit 29c obtains the face image from the camera 27 (Step S72).

Subsequently, the logout control unit 29c executes the face authentication based on the face image obtained at Step S71 and the face image obtained at Step S72 (Step S73). That is, the logout control unit 29c compares the face image obtained at Step S71 with the face image obtained at Step S72, determines that the user is authenticated when a similarity degree of the face image obtained at Step S71 and the face image obtained at Step S72 is equal to or more than a specific degree, and determines that the user is unauthenticated when a similarity degree of the face image obtained at Step S71 and the face image obtained at Step S72 is less than a specific degree.

After the process at Step S73, the logout control unit 29c determines whether the user has been authenticated or not as a result of the face authentication at Step S73 (Step S74).

When the logout control unit 29c determines that the user has been authenticated at Step S74, the logout control unit 29c overwrites and stores the current time as the authentication time 28b (Step S75) and then executes Step S72.

When the logout control unit 29c determines that the user has not been authenticated at Step S74, the logout control unit 29c determines whether a specific time period or more has elapsed from the authentication time 28b or not (Step S76). Here, the specific time period may be a fixed time period, or may be a random time period.

When the logout control unit 29c determines that the specific time period or more has not elapsed from the authentication time 28b at Step S76, the logout control unit 29c executes the process at Step S72.

When the logout control unit 29c determines that the specific time period or more has elapsed from the authentication time 28b at Step S76, the face-image managing unit 29b deletes the face image of the user who is logging in from the server 30 by transmitting the identification information of the user who is logging in to the server 30 (Step S77). The control unit 35 of the server 30 deletes the face image 34b deletion of which is instructed from the image forming apparatus 20, that is, the face image 34b stored associated with the identification information that has been transmitted from the image forming apparatus 20 at Step S77 from the storage unit 34.

After the process at Step S77, the logout control unit 29c causes the user who is logging in to log out (Step S78) to terminate the operations in FIG. 5.

As described above, the login and logout system 10 causes the user to log out (Step S78) when the user becomes unauthenticated for a specific time period or more (NO at Step S74) by the face authentication at Step S73 based on the face image that is captured by the camera 27 at the specific timing pertaining to the login permitted at Step S54 and the face image captured by the camera 27 each time. Thus, the login and logout system 10 does not unnecessarily cause the user to log out when the external appearance of the user does not significantly change in a short period of time from the specific timing pertaining to the login permitted at Step S54. Consequently, the login and logout system 10 ensures improvement of appropriateness of an automatic logout.

When a user is authenticated by an authentication method other than the face authentication based on the face image captured by the camera 27 (YES at Step S53), the login and logout system 10 permits the login of the user (Step S54). With this configuration, the login and logout system 10 does not need to store the face image for the login, thus ensuring eliminating a workload for preliminarily storing the face image for the login, eliminating a security risk of an outflow of the face image for the login, and reducing a storage capacity necessary to store the face image for the login.

The login and logout system 10 may permit the login of a user when the user is authenticated by the face authentication based on the face image captured by the camera 27.

The login and logout system 10 deletes the face image 34b, which is stored in the storage unit 34 of the server 30 for the logout, from the storage unit 34 of the server 30 by the logout (Step S77), thus ensuring the reduced security risk of the outflow of the face image 34b, which is stored in the storage unit 34 of the server 30 for the logout, and reducing the storage capacity necessary for the storage unit 34 of the server 30 to store the face image 34b for the logout after the logout.

The login and logout system 10 needs not to delete the face image 34b, which is stored in the storage unit 34 of the server 30 for the logout, from the storage unit 34 of the server 30 by the logout.

The login and logout system 10 does not cause the user to log out if a time period when the user has become unauthenticated is less than the specific time period (NO at Step S76) even when the user becomes unauthenticated (NO at Step S74) by the face authentication based on the face image that is captured by the camera 27 at the specific timing pertaining to the permitted login and the face image captured by the camera 27 each time. The login and logout system 10 ensures the improved convenience. For example, the login and logout system 10 ensures the reduced possibility of the logout of the user when the user who is logging in to the image forming apparatus 20 moves away from the image forming apparatus 20 only for a short period of time, and thus ensuring the improved convenience.

When an error is generated in the image forming apparatus 20, the user who is logging in to the image forming apparatus 20 is highly likely to move out of the capturing range of the camera 27 for eliminating the error generated in the image forming apparatus 20. Accordingly, when an error is generated in the image forming apparatus 20, the login and logout system 10 needs not to cause the user to log out even when the user has become unauthenticated for the specific time period or more by the face authentication based on the face image that is captured by the camera 27 at the specific timing pertaining to the permitted login and the face image captured by the camera 27 each time. For example, when it is determined that the user has not been authenticated at Step S74 when an error was generated in the image forming apparatus 20, the image forming apparatus 20 may once halt the operations illustrated in FIG. 5 without executing Step S76; after that, when the error is eliminated, the image forming apparatus 20 may determine whether the specific time period or more has elapsed from the authentication time 28b or not at Step S76, after adding "a time period until the error is eliminated from when the operations illustrated in FIG. 5 was once halted" to the current specific time period.

In the login and logout system 10, at least a part of the above-described functions of the image forming apparatus 20 may be achieved by the server 30. For example, the face authentication may be executed by the server 30. For example, after obtaining a face image at Step S72 illustrated FIG. 5, the logout control unit 29c of the image forming apparatus 20 transmits the face image to the server 30 via the communication unit 26. After obtaining the face image from the image forming apparatus 20, the control unit 35 of the server 30 executes the process similar to that at Step S73 to transmit a result of the face authentication to the image forming apparatus 20 via the communication unit 33. After obtaining the result of the face authentication from the server 30, the control unit 29 of the image forming apparatus 20 executes the processes at and after Step S74. Execution of the face authentication by the server 30 can omit the process at Step S71.

In the login and logout system 10, at least a part of the above-described functions of the server 30 may be achieved by the image forming apparatus 20. For example, the image forming apparatus 20 may store the face image that is captured by the camera 27 at the specific timing pertaining to the permitted login to the storage unit 28. When the image forming apparatus 20 achieves all the above-described functions of the server 30, the login and logout system 10 needs not to include the server 30.

While the login and logout system 10 ensures authentication at the login and storing of the face image by the one server 30 in the embodiment, the login and logout system 10 may ensure the authentication at the login and storage of the face image by different computers.

While the image forming apparatus 20 includes the camera in the embodiment, the login and logout system 10 may include a camera separately from the image forming apparatus 20.

While the electronic device of the disclosure is the image forming apparatus in the embodiment, it may be an electronic device other than an image forming apparatus, such as PC.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A login and logout system comprising:
   an electronic device;
   a camera located where the camera can capture a face image of a person situated in front of the electronic device;
   a storage device storing user-login face images of users of the electronic device;
   a login control unit for controlling user login of a user of the electronic device;
   a face-image managing unit operatively connected to the storage device, for managing the user-login face images stored in the storage device; and
   a logout control unit operatively connected to the camera and to the storage device, for controlling user logout; wherein
   when the user is authenticated by an authentication method other than face authentication based on a face image captured by the camera, the login control unit permits login of the user,
   the face-image managing unit writes into the storage device a face image that is captured by the camera at login permitted by the login control unit, and
   after login of the user is permitted by the login control unit, the logout control unit obtains from the storage device the face image of the user whose login is permitted, obtains from the camera the face image of a person situated in front of the electronic device, compares the face image obtained from the camera with the face image obtained from the storage device, determines that the user is authenticated when a degree of similarity between the face image obtained from the storage device and the face image obtained from the camera is at least a given degree, and determines that the user is unauthenticated when a degree of similarity between the face image obtained from the storage device and the face image obtained from the camera is less than a given degree, and causes the user to log out when the user becomes unauthenticated by the face authentication.

2. The login and logout system according to claim 1, wherein when the logout control unit causes the user to log out, the face-image managing unit deletes the face image of the user from the storage device.

3. The login and logout system according to claim 1, wherein after the login of the user is permitted by the login control unit, the logout control unit causes the user to log out when the user has become unauthenticated for a specific time period or more by the face authentication based on the face image captured by the camera and the face image stored in the storage device.

4. An electronic device associated with a camera located where the camera can capture a face image of a person situated in front of the electronic device, and with a storage device storing user-login face images of users of the electronic device, the electronic device comprising:
   a login control unit for controlling login of a user;
   a face-image managing unit operatively connected to the storage device, for managing the user-login face images stored in the storage device; and
   a logout control unit operatively connected to the camera and to the storage device, for controlling user logout; wherein
   when the user is authenticated by an authentication method other than face authentication based on a face image captured by the camera, the login control unit permits login of the user,
   the face-image managing unit writes into the storage device a face image that is captured by the camera at login permitted by the login control unit, and
   after login of the user is permitted by the login control unit, the logout control unit obtains from the storage device the face image of the user whose login is permitted, obtains from the camera the face image of a person situated in front of the electronic device, compares the face image obtained from the camera with the face image obtained from the storage device, determines that the user is authenticated when a degree of similarity between the face image obtained from the storage device and the face image obtained from the camera is at least a given degree, and determines that the user is unauthenticated when a degree of similarity between the face image obtained from the storage device and the face image obtained from the camera is less than a given degree, and causes the user to log out when the user becomes unauthenticated by the face authentication.

5. For an electronic device including a computer and associated with a camera located where the camera can capture a face image of a person situated in front of the electronic device, and with a storage device storing user-login face images of users of the electronic device, a non-transitory computer-readable recording medium storing a login and logout program, the login and logout program causing the electronic-device computer to function as:

a login control unit for controlling login of a user;

a face-image managing unit operatively connected to the storage device, for managing the user-login face images stored in the storage device; and a logout control unit operatively connected to the camera and to the storage device, for controlling user logout; wherein when the user is authenticated by an authentication method other than face authentication based on a face image captured by the camera, the login control unit permits login of the user, the face-image managing unit writes into the storage device a face image that is captured by the camera at login permitted by the login control unit, and after login of the user is permitted by the login control unit, the logout control unit obtains from the storage device the face image of the user whose login is permitted, obtains from the camera the face image of a person situated in front of the electronic device, compares the face image obtained from the camera with the face image obtained from the storage device, determines that the user is authenticated when a degree of similarity between the face image obtained from the storage device and the face image obtained from the camera is at least a given degree, and determines that the user is unauthenticated when a degree of similarity between the face image obtained from the storage device and the face image obtained from the camera is less than a given degree, and causes the user to log out when the user becomes unauthenticated by the face authentication.

* * * * *